Sept. 15, 1953
N. M. HUFF
2,652,226
LOCKING STEM ADJUSTMENT VALVE
Filed Nov. 23, 1948
2 Sheets-Sheet 1
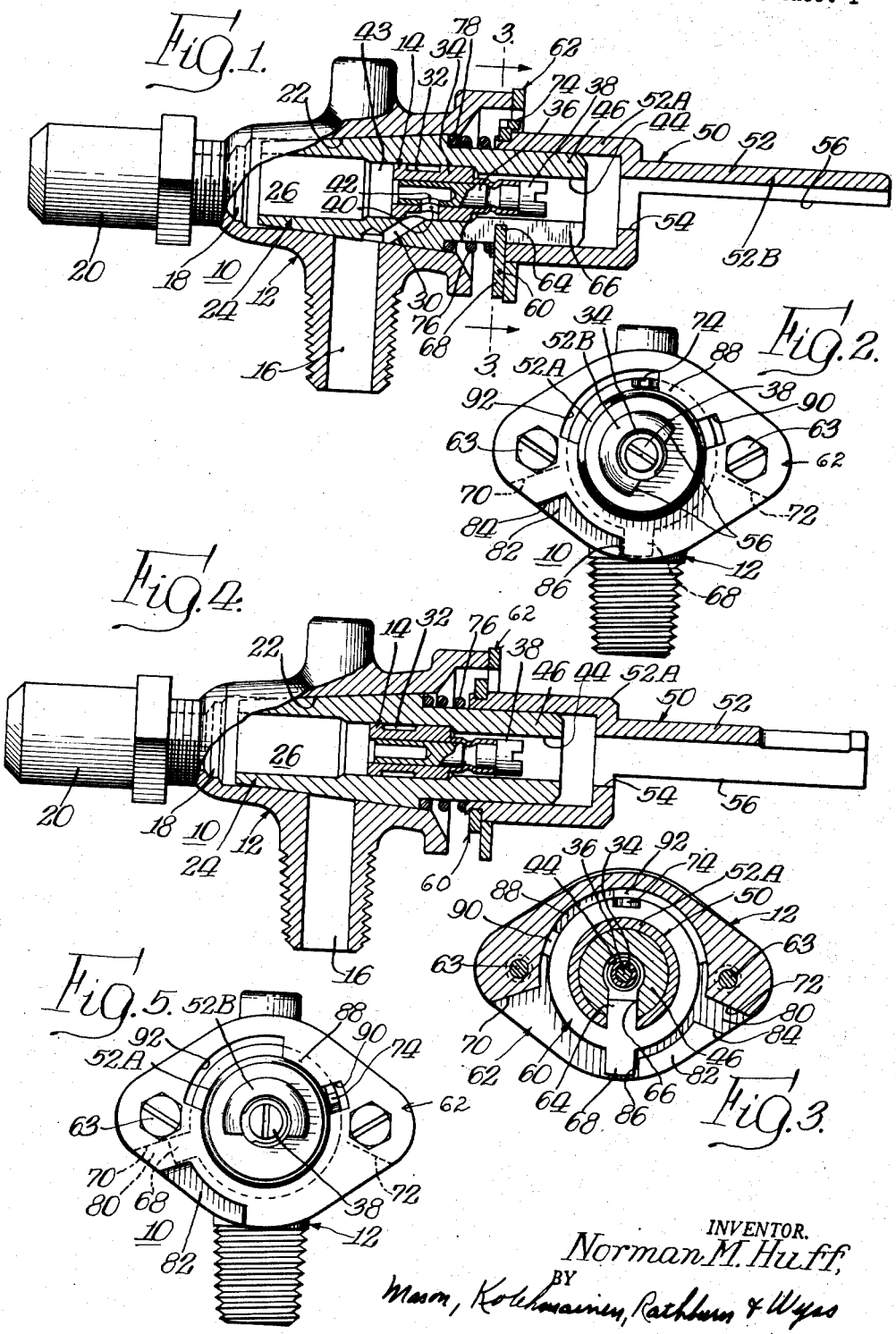
INVENTOR.
Norman M. Huff,
BY
Mason, Kolehmainen, Rathburn & Wyss
Attys.

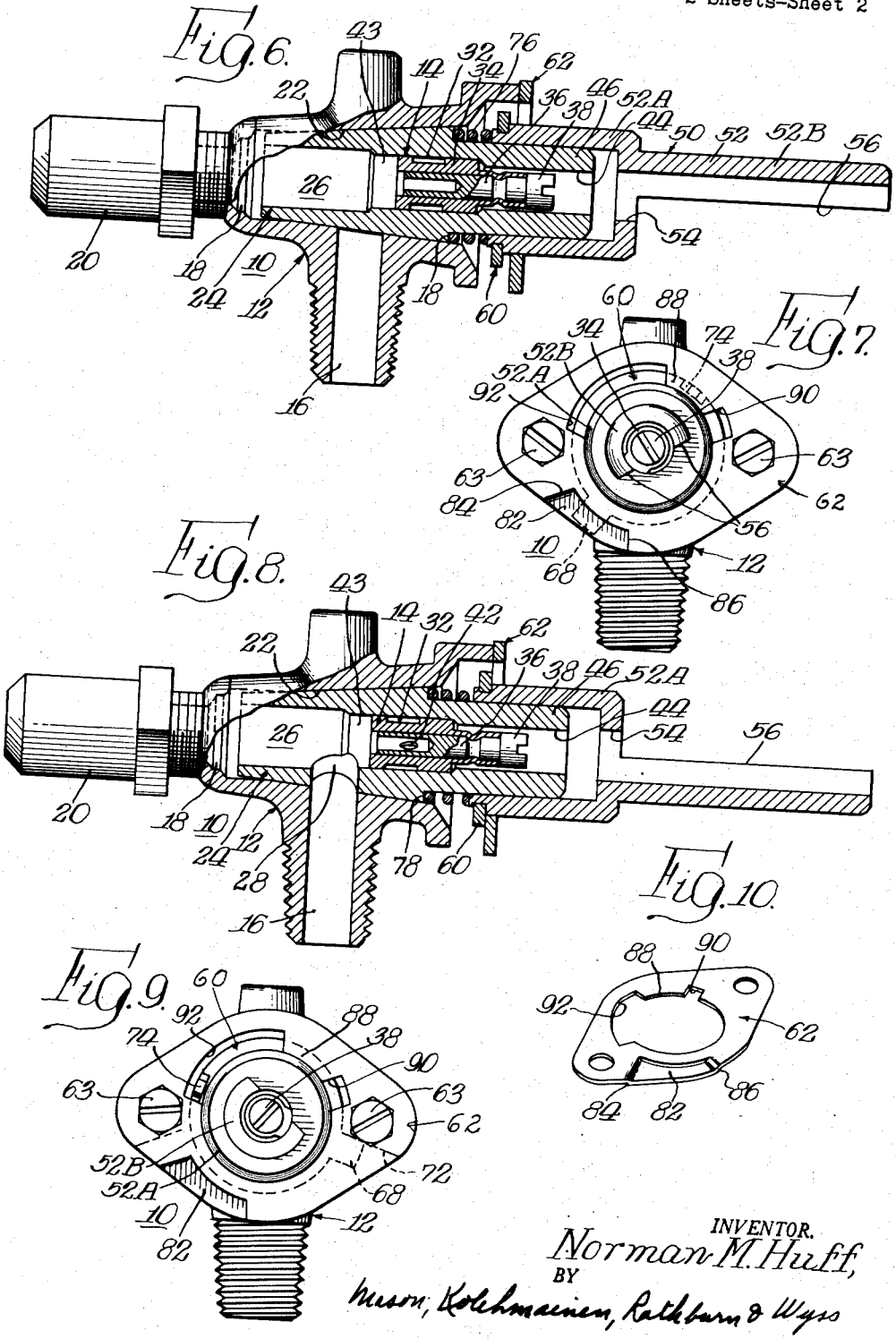

Patented Sept. 15, 1953

2,652,226

UNITED STATES PATENT OFFICE 2,652,226

LOCKING STEM ADJUSTMENT VALVE

Norman M. Huff, Chicago, Ill., assignor to Harper-Wyman Company, Chicago, Ill., a corporation of Illinois Application November 23, 1948, Serial No. 61,604

7 Claims. (Cl. 251—163)

The present invention relates to gas valves and has for its primary object the provision of a new and improved locking stem adjustment type gas valve.

Another object of the present invention is to provide a new and improved locking stem adjustment valve including a considerably simplified and readily fabricated locking and driving mechanism.

A further object of the present invention is the provision of a new and improved locking stem adjustment valve comprising what may be considered a two-part stem of two slidably connected parts and a single structural element for drivingly connecting the two parts, locking the valve in off position, and indicating another position of the valve, and which is so constructed and arranged as to minimize "shake" between the parts and also to provide a balanced thrust upon the movable one of the parts in all positions of the valve so as to eliminate undesired binding between them.

Other objects and advantages of the invention will become apparent from the following description of an embodiment thereof, in the course of which reference is had to the accompanying drawings, in which:

Fig. 1 is a side elevational view, partly in axial section, of a valve (minus the conventional operating handle) constructed in accordance with the present invention and illustrated in a low position;

Fig. 2 is an end view from the outer or handle receiving end of the valve shown in Fig. 1;

Fig. 3 is a transverse cross sectional view taken along the line 3—3 of Fig. 1;

Figs. 4 and 5 are views similar to Figs. 1 and 2 illustrating the valve in its off position;

Figs. 6 and 7 are similar to Figs. 1 and 2 illustrating the valve in an intermediate position between the off and low positions;

Figs. 8 and 9 are views similar to Figs. 1 and 2 of the valve in its full on or high position; and Fig. 10 is a perspective view of the cap or plate forming part of the valve.

The present invention has been illustrated in conjunction with a plural position gas valve 10 of the type commonly called a high-low valve, having a body 12 and stem adjustment means comprising an auxiliary valve unit 14 which is adjustable for the purpose of determining the flow of gas in the low position of the valve and including features disclosed and claimed in the copending applications of Philip S. Harper, Serial No. 576,673 (now Patent No. 2,590,535), filed February 7, 1945, and of Vincent C. Peterson, Serial No. 600,795 (now Patent No. 2,590,569), filed June 21, 1945, and assigned to the assignee of this application.

The valve body is provided with an inlet passageway 16, an outlet passageway 18, communicating at its discharge end with a conventional adjustable outlet hood 20, a tapered plug-receiving chamber 22, and a valve plug 24 having a correspondingly tapered outer surface closely fitting within the tapered plug-receiving chamber.

The valve plug includes an axial passageway 26 at one end and a pair of angularly spaced apart radially extending passageways 28 and 30, the former of which registers with the inlet passageway in the full on position of the valve as shown in Fig. 8 and the latter in the low position as shown in Fig. 1. Passageway 28 extends directly from the axial passageway to the exterior of the plug, whereas the passageway 30 leads to an annular passageway 32 extending around the auxiliary valve unit and formed as by an annular groove in an insert 34 forming part of the auxiliary valve unit.

The flow of gas in the low position is regulatable by adjustment of a rotatable valve member 36 of the auxiliary valve unit which has an enlarged slotted head 38 whereby it can be turned to adjust the registry of openings 40 and 42 in insert 34 and the rotatable valve member 36, respectively. The insert 34 is fixedly mounted in an axial passageway 43 communicating with the axial passageway 26 and the rotatable valve member 36 extends into a smaller continuation 44 of the axial passageway through the reduced diameter forward extension 46 of the valve plug which forms, in effect, part of the valve operating stem.

The valve includes mechanism for driving and locking the valve in its off position, for indicating the various positions of the valve and for determining the off and high positions. This mechanism may be and is illustrated as being of the type disclosed in the contemporaneously filed application of Vincent C. Peterson and Henry H. Nadasdy, Serial No. 61,652. It includes what may be considered a two-part stem, indicated as a whole by the reference character 50 and including the extension 46 and a part 52 which is rotatable with but axially movable relative to the part 46. While the two parts 46 and 52 have been stated to be parts of the stem 50, this is a matter of preference, as the stem can be considered to include either two parts or a portion of the valve plug and a single stem part. Hereafter the two parts will be referred to as parts of the stem and while they will also be so claimed, it should be understood that the terminology is to be considered broadly and to include either a two-part stem or a stem and a portion of the valve plug.

The inner stem portion 46 is provided with the previously referred to axial passageway 44 and the outer portion 52 includes an enlarged tubular portion 52A fitting relatively closely around the outer end of portion 46 and a reduced diameter portion 52B having an axial passageway 54 extending through it and provided with a flat 56, thereby effectively making the outer end D-shaped better nonrotatably to receive a valve operating handle, not shown. The construction, as readily apparent from Fig. 1, is such that the slotted outer end 38 of the rotatable auxiliary valve element 36 can be reached by a screw driver after removal of the handle for the purpose of adjusting the flow of gas.

The mechanism also includes a combined driving, locking and indicating washer 60 and a locking and position indicating end cap or plate 62 secured to the front of the valve body as by screws 63. The washer 60 surrounds the stem portion 46 and is secured to the inner end of portion 52 in suitable manner, as by peening. The washer has a radially inwardly extending projection 64, in the nature of a tongue and extending into an axially extending slot 66 in stem portion 46, thereby providing a driving connection between the two stem parts and yet enabling the parts to be moved axially relative to each other. The washer also has a radially outwardly extending projection 68, also in the nature of a tongue, which is movable against stop defining shoulders 70 and 72 formed at the front of the valve body and determining the off and full on positions of the valve plug, respectively.

The valve stem or, more particularly, that portion carrying the washer is forced outwardly so that the washer bears against the plate 62 by a spring 76 encircling stem portion 46 and bearing against the washer 60 and a shoulder 78 formed in the valve plug.

The valve is locked in its off position, in which it is shown in Figs. 4 and 5, by the projection 68 and by a radially extending recess 80 in which the projection 68 is yieldably held by the spring 76. The recess 80 is formed in suitable manner, as by shoulder 70 and an inwardly stamped portion 82 of the plate 62. The end 84 of the indentation, which forms a shoulder, is quite square so that the outer portion 52 of the valve stem has to be pushed inwardly before the valve plug can be rotated. Once the stem is pushed in and turned slightly, the projection 68 bears against the undersurface of portion 82, which has an arcuate length such that the projection 68 falls off of it in the low position, shown in Figs. 1, 2 and 3. The shoulder 86 off which the projection falls in this low position is inclined somewhat so that the low position can readily be determined by a restraint to movement when the valve plug is being turned from its high position toward the off position.

The valve of the present invention is characterized by a minimum of "shake" between the two parts of the stem and by the application of balanced pressure to the outer stem portion and the washer secured to it so as to eliminate undesired binding between the parts. The shake is minimized by having the outer stem part 52A fit quite closely around the part 46 and the balanced operation is obtained by providing the washer 60 with an axial forwardly extending projection 74 and the end plate 62 with a cooperating radially inwardly extending part 88. The projection 74 is diametrically opposite tongue 68 and the part 88 is diametrically opposite the part 82 and these are of corresponding lengths so that the washer is maintained normal to the stem in all positions of the valve, thereby to maintain the stem portions in axial alignment and to prevent binding. The part 88 is thus so located and dimensioned as to form a slot 90 diametrically opposite the locking recess 80 and a slot 92 diametrically opposite that portion of the end cap at which the locking tongue 68 engages the back side of the end plate, i. e., the portion between shoulder 86 and the stop shoulder 72.

The operation of the valve as a whole will now be described. Assuming first that the valve is in its off position, then the parts occupy the positions in which they are illustrated in Figs. 4 and 5. The valve plug is locked by reason of the locking projection 68 being yieldably held in recess 80 by the spring 76. The shoulder 84 of the recess forming means is square so that it is necessary to move inwardly the outer part 52 of the stem before the valve can be unlocked. The projection 74 is in slot 90 so that a balanced thrust is exerted by the spring against the inner side of the washer.

To unlock the valve it is necessary only to move the outer stem part 52 axially inwardly, thereby to move the washer 60 inwardly so that the projection 68 is moved out of the recess 80 and projection 74 out of slot 90. In normal operation, the valve is unlocked as described and initially turned to the full on position in which projection 68 abuts against shoulder 72 on the valve body and against the inner side of plate 62, as illustrated in Fig. 9. Projection 74 is in slot 92 so that a balanced pressure is again applied to the washer 60.

To turn the valve plug to its low position, as from the full on or high position, the stem and plug are turned in a clockwise direction from the position of Figs. 8 and 9 to the position of Figs. 1 and 2. When the low position is reached, the projection 68 strikes the inclined shoulder 86 on plate 62, and at the same time, projection 74 strikes the shoulder at the end of portion 88 of the end plate 62, and the movement of the plug is restrained, thus indicating that the valve has been moved to its low position. During movement of the plug from the full on to the low position, the projection 74 is in slot 92 so as to provide the desired balanced pressure.

To move from the low to the off position, the stem and plug are turned so that the projection 68 rises along the shoulder 86 and the projection 74 rises along the shoulder at the end of portion 88 of the end plate to continue the balanced pressure on the washer. (It should perhaps be noted that the projection 74 has inclined ends so that it only moderately restricts rotation of the parts.) The movement is continued until the projection 68 strikes shoulder 70 whereas the spring 76 moves the washer and stem part 52 outwardly to place projection 68 into recess 80 and thus lock the valve in its off position. The projection 74 is simultaneously moved into slot 92.

The construction of the present invention thus enables the two relatively movable parts of the stem to be fitted so as to have a minimum of shake between them and yet insures that they will move freely for locking and unlocking the valve.

While the present invention has been described in connection with the details of a particular embodiment thereof, it should be understood that such details are not intended to be limitative of the invention except in so far as set forth in the accompanying claims.

Having thus described my invention, what I claim as new and desire to secure by Letters Patent of the United States is:

1. In a locking type high-low gas valve including a valve element movable between off, low and high positions, a valve element rotating stem portion having an axially extending slot therein, a second stem portion fitting movably but relatively closely around said first portion, a locking, indicating and driving washer secured to said second portion and having radially inwardly and outwardly extending tongues, said inwardly extending tongue extending into said slot and connecting said stem portions for rotation of the element, a locking plate fixedly secured to the valve having an axially inwardly extending portion defining a pair of spaced apart shoulders, one of said shoulders being steep sided and located so that when the valve element is in its off position the outwardly extending tongue on said washer is engageable thereby to lock the element and the other being so located as to be engaged by said outwardly extending tongue in the low position of said valve moderately to restrict rotation of the element toward its off position, said washer having also an axially extending projection substantially diametrically opposite said tongue and said plate having a surface engageable by said projection when said tongue engages said axially inwardly extending portion, and spring means disposed between the valve element and said second stem portion and washer for biasing them toward said plate.

2. A locking type gas valve including a valve element, a rotating stem portion operatively connected to the element and axially movable relative to it, a locking washer encircling and fixedly secured to said stem portion and having a radially extending locking projection and a second projection substantially diametrically opposed to it, structure on said valve defining a first pair of diametrically oppositely located recesses adapted to receive said locking projection and second projection and having an angular extent such as to lock said locking projection against angular movement, said structure on said valve defining also a second pair of diametrically oppositely located recesses adapted to receive said locking projection and other projection and angularly spaced from said first pair of recesses by inter-recess surfaces, said second pair of recesses having an angular extent greater than that of said first pair of recesses, thereby to provide a region in which the stem portion is movable with the locking projection and other projection in said second pair of recesses, and spring means acting on said stem portion and washer for yieldably holding said locking projection in said recesses and against said surfaces.

3. A locking type gas valve including a rotatable valve element, a rotating stem portion operatively connected to the element and axially movable relative to it, two cooperating members including a first member encircling and fixedly secured to said stem portion and a second member fixedly mounted on said valve and located adjacent said first member, one of said members having a radially extending locking projection and a second projection substantially diametrically opposed to it and the other of said members having structure defining a first pair of diametrically oppositely located recesses adapted to receive said locking projection and second projection and having an angular extent such as to lock said locking projection against angular movement, said structure defining also a second pair of diametrically oppositely located recesses adapted to receive said locking projection and second projection and angularly spaced from said first pair of recesses by inter-recess surfaces, said second pair of recesses having an angular extent greater than that of said first pair of recesses, thereby to provide a region in which the stem portion is movable with the locking projection and second projection in said second pair of recesses, and spring means acting on said stem portion and first member for yieldably holding said locking projection in said recesses and against said surfaces.

4. A locking type gas valve including a rotatable valve element having a first stem portion with an axial slot, a second stem portion surrounding said first portion and axially movable relative to it, a driving and locking member encircling and fixedly secured to said second stem portion and having a radially inwardly extending tongue projecting into said slot and thus being in driving relation to said first stem portion, a second member cooperating with the first member and fixedly mounted on said valve adjacent said first member, one of said members having a radially extending locking projection and a section projection substantially diametrically opposed to it and the other of said members having structure defining a first pair of diametrically oppositely located recesses adapted to receive said locking projection and second projection and having an angular extent such as to lock said locking projection against angular movement, said structure defining also a second pair of diametrically oppositely located recesses adapted to receive said locking projection and second projection and angularly spaced from said first pair of recesses by inter-recess surfaces, said second pair of recesses having an angular extent greater than that of said first pair of recess, thereby to provide a region in which the stem portion is movable with the locking projection and second projection in said second pair of recesses, and spring means acting on said stem portion and first member for yieldably holding said locking projection in said recesses and against said surfaces.

5. A locking type gas valve including a valve element rotating stem portion with an axially extending slot, a second stem portion surrounding the first portion and axially movable relative to it, a valve element driving and locking washer secured to said second stem portion having a driving portion extending radially inwardly into said slot and a radially outwardly extending locking projection, structure on the valve defining a recess adapted to receive said locking projection, and spring means acting on said second stem portion and washer for yieldably holding said locking projection in said recess, and said washer and valve having cooperating bearing surfaces cooperating with said locking projection for holding said second stem portion in coaxial relation relative to said first portion when said locking projection is both in and out of said recess.

6. A locking type gas valve including a hollow valve element rotating stem portion with an axially extending slot, a second hollow stem portion surrounding a substantial length of the first portion and axially movable relative to it, a valve element driving and locking washer secured to said second stem portion having a driving portion extending radially inwardly into said slot and a radially outwardly extending locking projection, structure on the valve defining a recess adapted to receive said locking projection, and spring means acting on said second stem portion and washer for yieldably holding said locking projection in said recess, and said washer and valve having cooperating bearing surfaces cooperating with said locking projection for holding said second stem portion in coaxial relation relative to said first portion when said locking projection is both in and out of said recess.

7. A locking type gas valve including a valve element rotating stem portion, a second stem portion driving the first and closely surrounding the first portion and axially movable relative to it, two cooperating members including a first member secured to said second stem portion and a second member fixedly mounted on the valve and located adjacent the outer side of said first member, one of said members having a radially extending locking projection and a second projection spaced from the first and the other of said members having spaced recesses adapted to receive said locking projection and second projection, and spring means acting on said second stem portion and first member for yieldably holding said locking projection and second projection in said recesses, and said two members having cooperating bearing surfaces cooperating with said projections for holding said second stem portion in coaxial relation relative to said first portion when said projections are both in and out of said recesses.

NORMAN M. HUFF.

References Cited in the file of this patent
UNITED STATES PATENTS

| Number | Name | Date |
|---|---|---|
| 1,714,374 | Jorgensen | May 21, 1929 |
| 1,921,779 | Roberts | Aug. 8, 1933 |
| 2,161,523 | Moecker | June 6, 1939 |
| 2,257,886 | Mueller | Oct. 7, 1941 |
| 2,262,703 | Stuckenholt | Nov. 11, 1941 |